Figure 1:
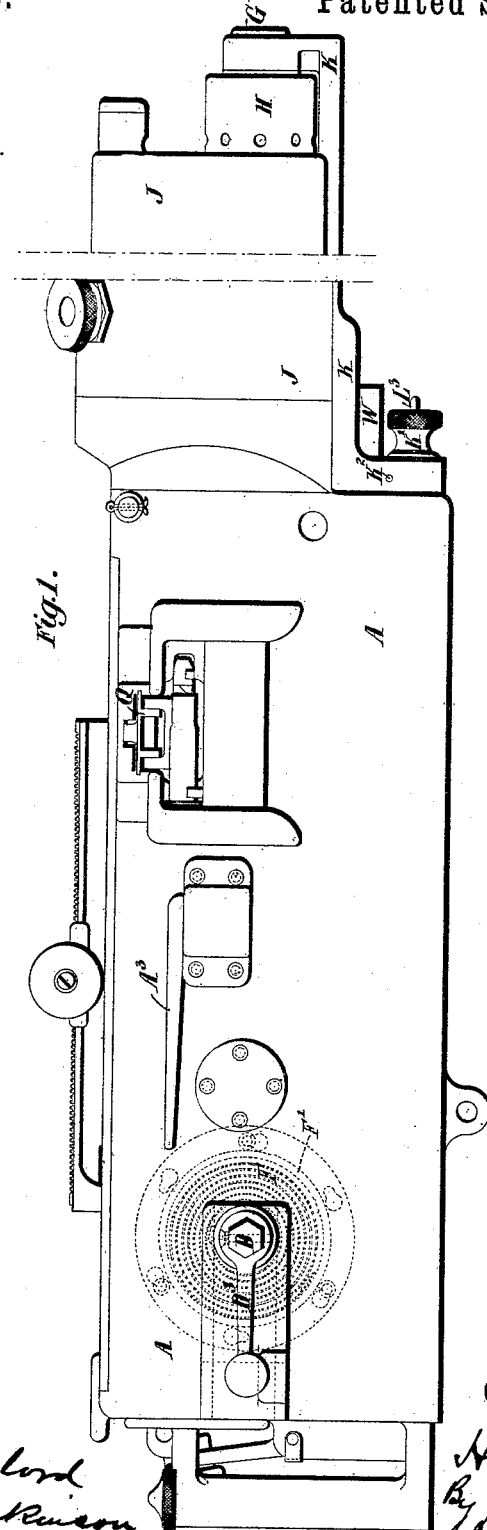

(No Model.) 9 Sheets—Sheet 1.

H. S. MAXIM.
AUTOMATIC GUN.

No. 459,828. Patented Sept. 22, 1891.

Witnesses:
Robt. F. Gaylord
Ernst Hopkinson

Inventor
Hiram S. Maxim
By Duncan & Page
atty.

(No Model.) 9 Sheets—Sheet 2.
H. S. MAXIM.
AUTOMATIC GUN.

No. 459,828. Patented Sept. 22, 1891.

Witnesses:
Robt. F. Gaylord
Ernest Hopkinson

Inventor:
Hiram S. Maxim
By Duncan & Page
attys.

(No Model.) 9 Sheets—Sheet 3.

H. S. MAXIM.
AUTOMATIC GUN.

No. 459,828. Patented Sept. 22, 1891.

Witnesses:
Robt. F. Gaylord
Ernest Hopkinson

Inventor
Hiram S. Maxim
By Duncan & Page
attys (No Model.)
H. S. MAXIM.
AUTOMATIC GUN.
No. 459,828.
9 Sheets—Sheet 4.
Patented Sept. 22, 1891.
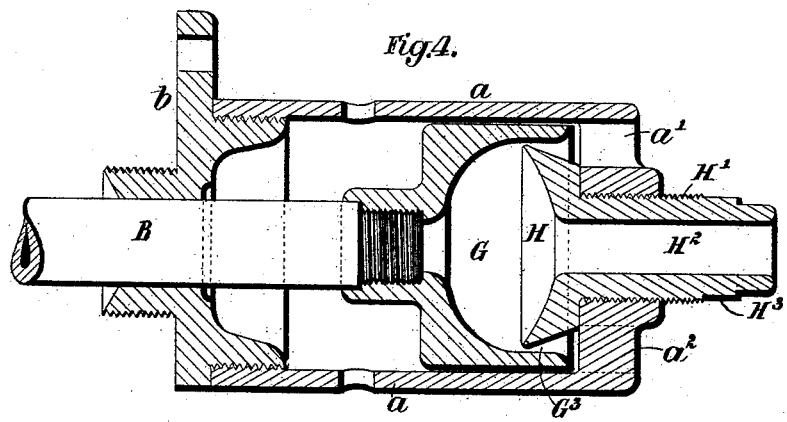
Fig. 4.
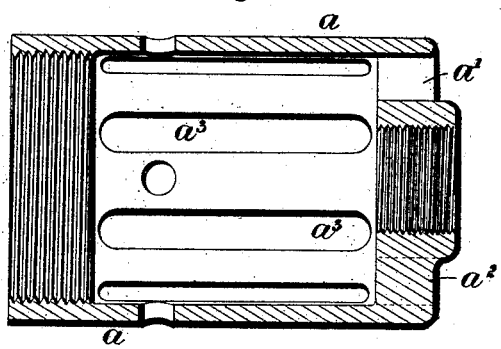
Fig. 5.
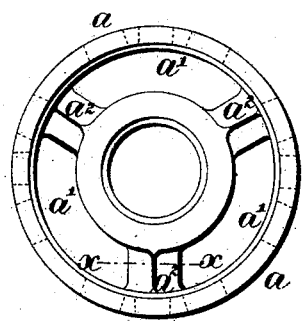
Fig. 6.
Fig. 7.
Witnesses
Robt. F. Gaylord
Ernest Hopkinson
Inventor:
Hiram S. Maxim
By Duncan & Page Attys

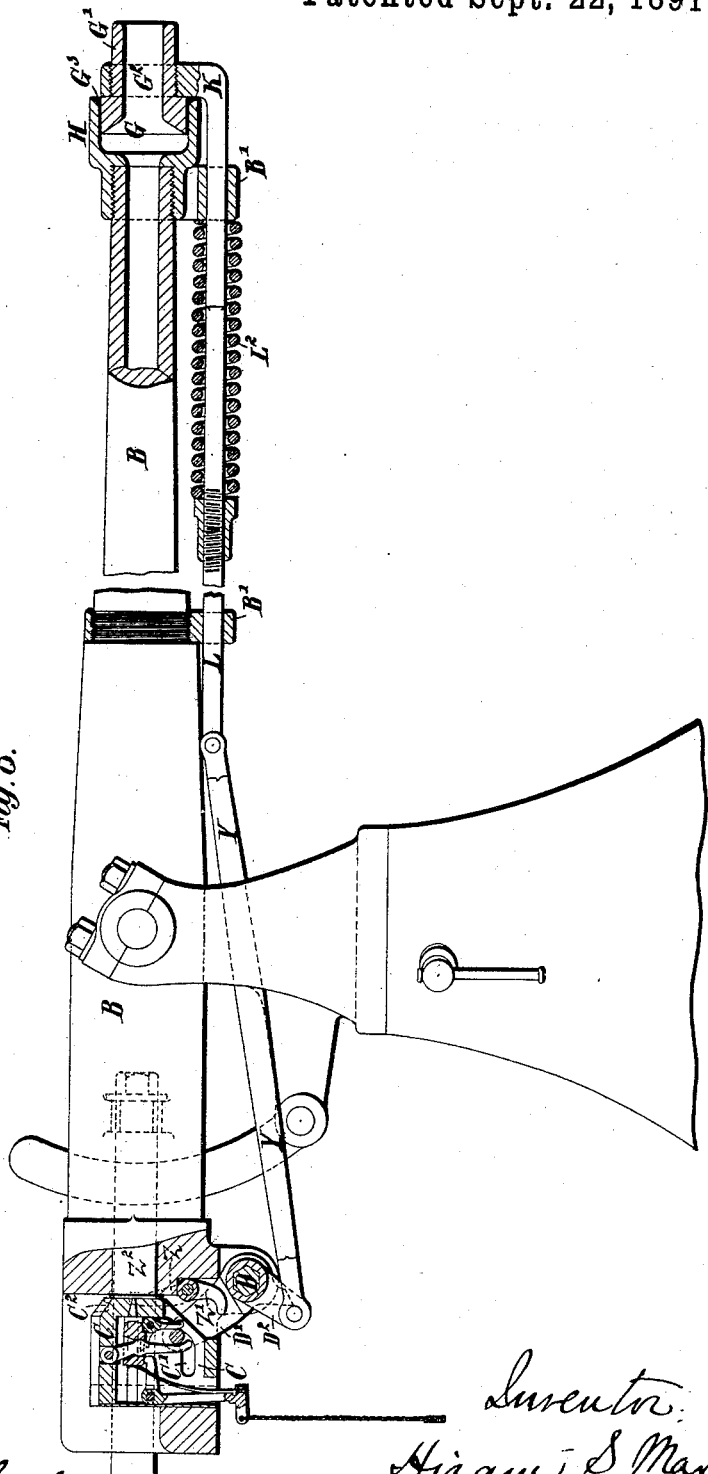

(No Model.) 9 Sheets—Sheet 6.
H. S. MAXIM.
AUTOMATIC GUN.
No. 459,828. Patented Sept. 22, 1891.
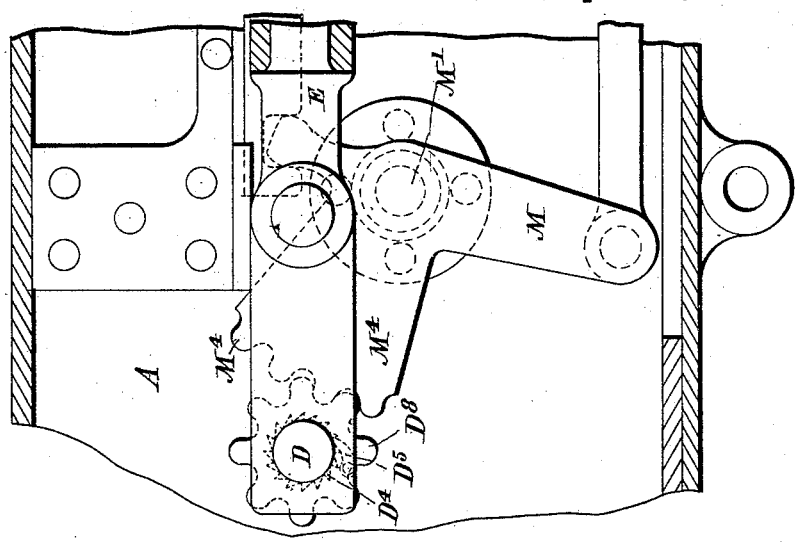
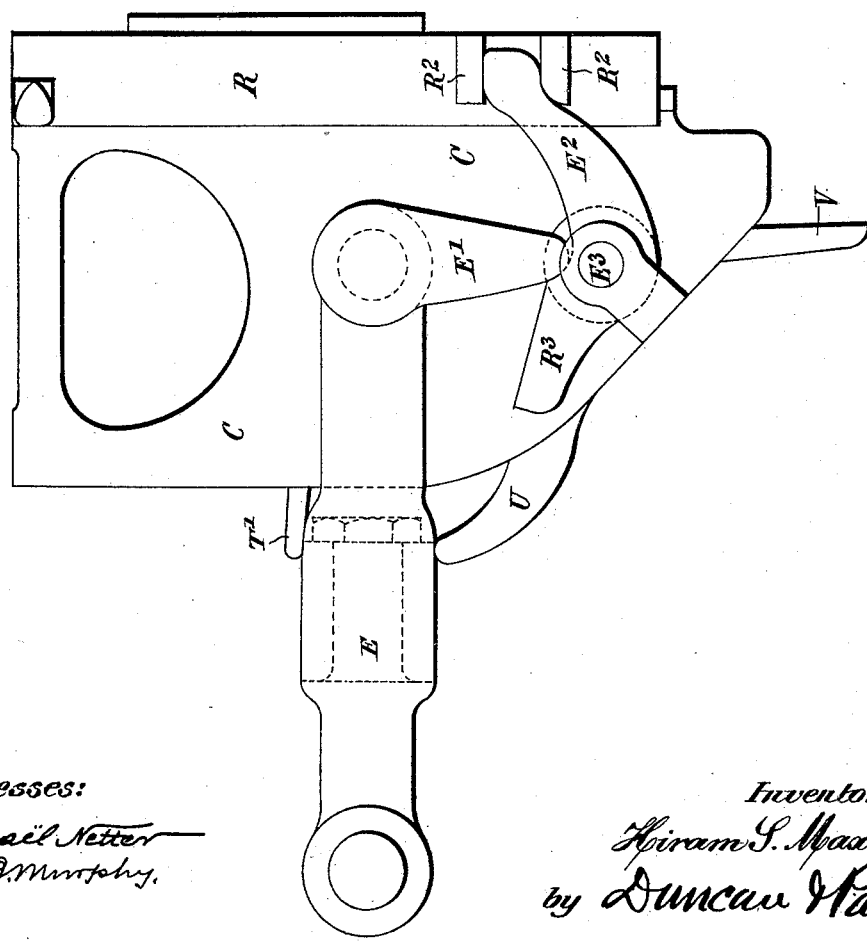
Witnesses:
Raphaël Netter
Frank B. Murphy
Inventor
Hiram S. Maxim
by Duncan Page
Attorneys.

(No Model.) H. S. MAXIM. 9 Sheets—Sheet 7.
AUTOMATIC GUN.

No. 459,828. Patented Sept. 22, 1891.

Witnesses:
Raphael Netter
Frank B. Murphy

Inventor
Hiram S. Maxim
by Duncan & Page
Attorneys.

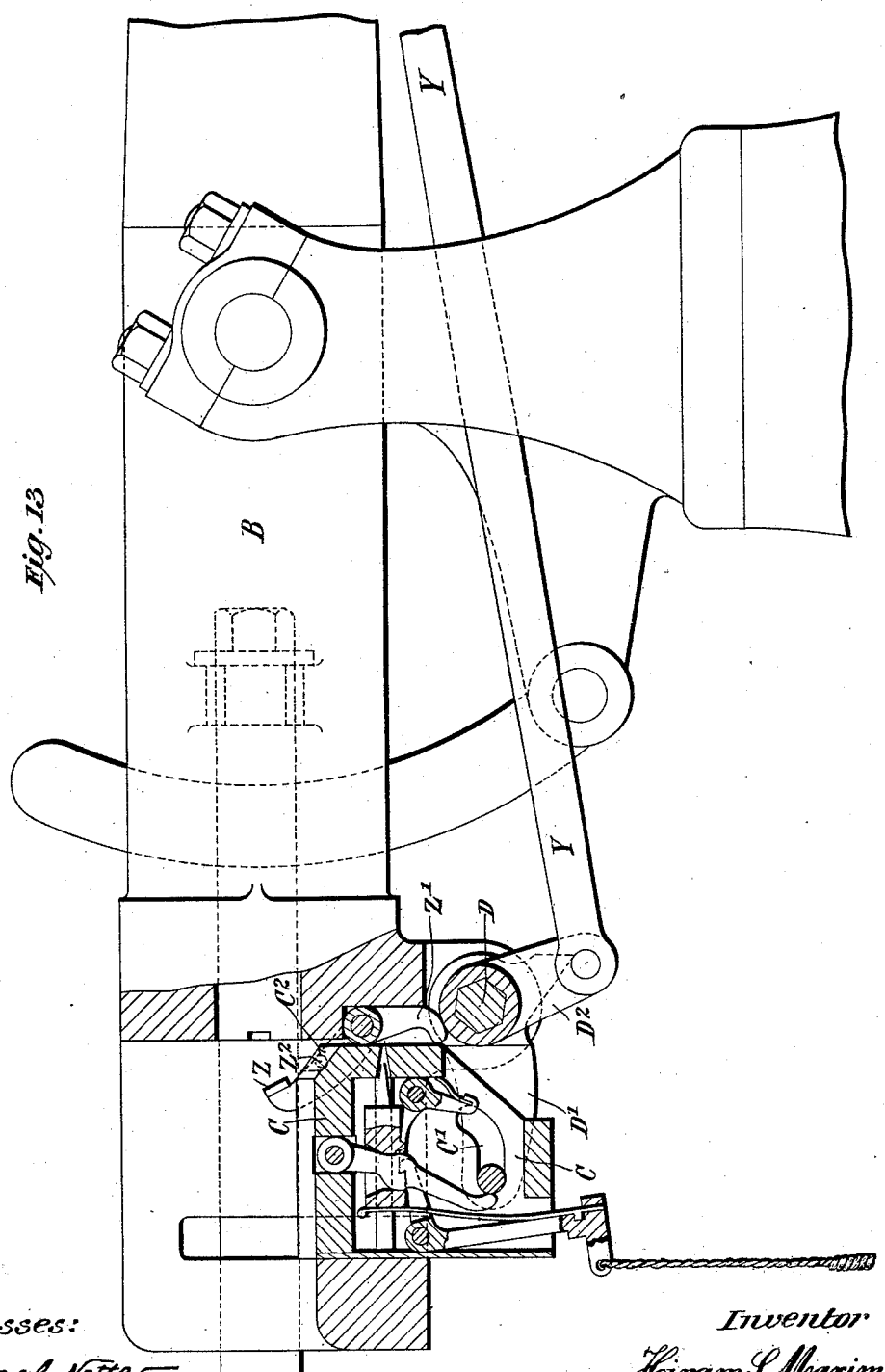

(No Model.) 9 Sheets—Sheet 9.
H. S. MAXIM.
AUTOMATIC GUN.

No. 459,828. Patented Sept. 22, 1891.

Witnesses:
Raphael Netter
Frank B. Murphy

Inventor
Hiram S. Maxim
by
Duncan & Page
Attorneys.

UNITED STATES PATENT OFFICE.

HIRAM STEVENS MAXIM, OF LONDON, ENGLAND.

AUTOMATIC GUN.

SPECIFICATION forming part of Letters Patent No. 459,828, dated September 22, 1891.

Application filed July 14, 1890. Serial No. 358,734. (No model.)

*To all whom it may concern:*

Be it known that I, HIRAM STEVENS MAXIM, mechanical engineer, a citizen of the United States, and a resident of London, England, have invented certain new and useful Improvements Relating to Automatic Guns, of which the following is a specification, reference being had to the accompanying drawings.

My invention relates in part to that kind or class of automatic guns which are operated entirely by the pressure of the gases expelled from the muzzle of the gun.

My present invention also applies to and comprehends automatic guns operated partly by the force of the recoil and partly by the force of pressure of the gases expelled from the muzzle of the gun, and an important advantage secured by my present invention is that it provides means whereby guns of the general character above described may be operated either with blank or ball cartridges. Guns of the kind above referred to have heretofore been constructed by me with a sleeve or other suitable device on the muzzle, which is connected with the breech mechanism and is arranged to be moved forward by the dynamic force of the gases issuing from the muzzle for the purpose of operating the breech mechanism, the operation being completed by suitable devices for storing the energy of the forward movement of the sleeve. My present invention is an improved mechanism constructed on this principle for utilizing the force or pressure of the gases to operate or assist in the operation of the breech mechanism.

One feature of my present invention is the construction of the gun with a muzzle attachment comprising two flanges or cup-shaped pieces or disks having apertures for the passage of the shot or bullet and so arranged relatively to each other that a chamber is formed between them, in which the gases issuing from the muzzle of the gun will expand and from which such gases can escape through the forward cup-shaped piece or disk and through an annular space or passage between the two cup-shaped pieces or disks. One of these pieces is preferably so formed that it serves as a kind of cylinder, in which the other piece moves somewhat like a piston, and one of the said cup-shaped pieces or disks is capable of longitudinal movement relatively to the other and is connected in any convenient manner with the breech mechanism, so that when moved by the said gases it will operate or assist in operating the said mechanism. One of the said cup-shaped pieces or disks is sometimes made adjustable longitudinally relatively to the other for the purpose of varying the area of the annular space or channel between them and for increasing or diminishing the force exerted by the gases upon the movable piece or disk.

My said invention moreover comprises the combination, with the movable cup-shaped piece or disk and the breech mechanism, of intermediate connections between the same, whereby on the gun being fired the said cup-shaped piece or disk will be driven forward and will operate the said mechanism so as to open the breech, extract the empty cartridge-shell, and draw a fresh cartridge from a feed-belt, and the said cup-shaped piece or disk will then return independently of the breech-block, and will, before the breech-block is driven home, move the said feed-belt, so as to bring another cartridge into position to be seized by the forks or projections on the said block.

My said invention also comprises the combination of my improved muzzle attachment with guns provided with breech mechanism which is arranged to be operated by the to-and-fro movement of the gun in a frame, cradle, or other support. In this case I attach the movable cup-shaped piece or disk to the muzzle of the gun, so that the force or pressure of the gases expelled therefrom will be utilized for driving the gun backward in the said frame, cradle, or support. The muzzle attachment can thus be applied to any gun in which provision is made for utilizing the recoil or backward movement of the gun for operating the breech mechanism. I find it advantageous in some cases to inclose the said cup-shaped pieces or disks in a hollow cylinder or casing, as hereinafter described.

In the accompanying drawings I have shown how my said invention may be conveniently and advantageously carried into practice.

Figure 2:
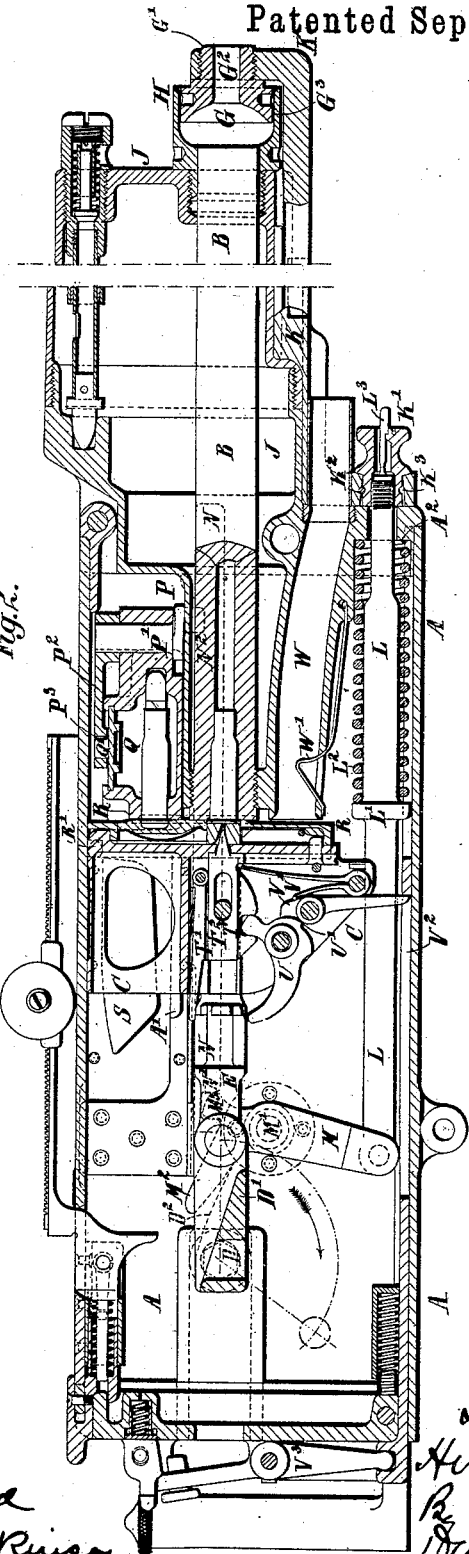
Figure 11:
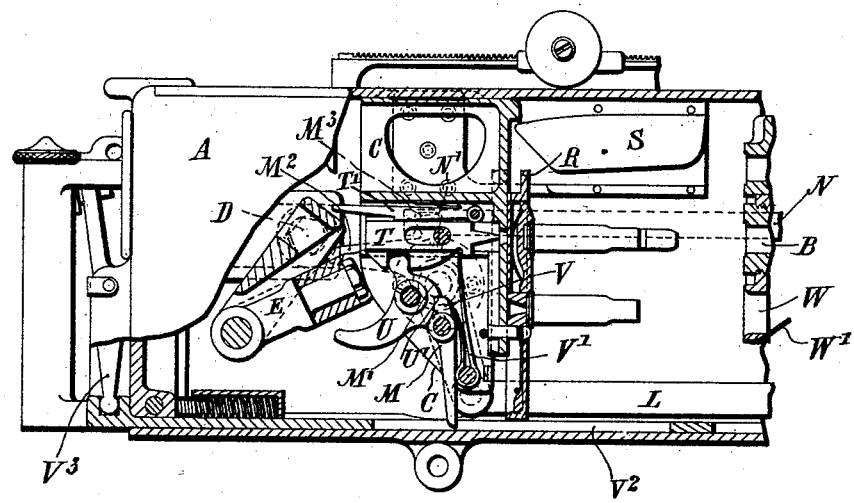
Figure 10:
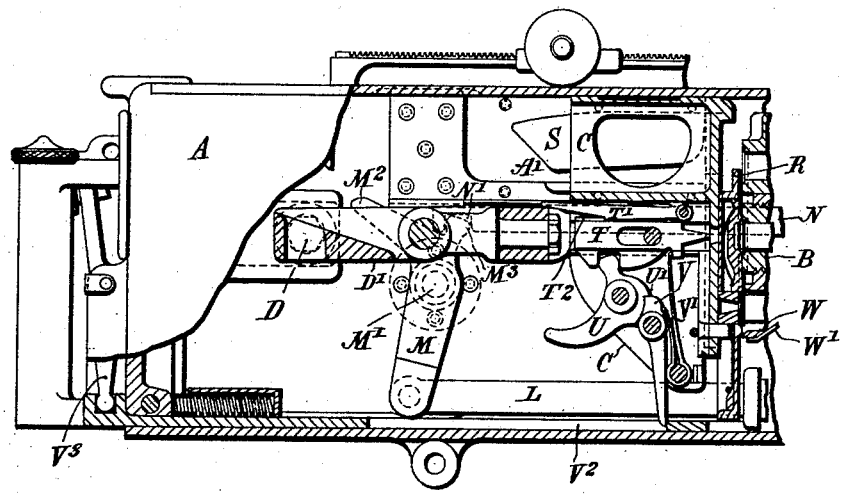
Figure 14:
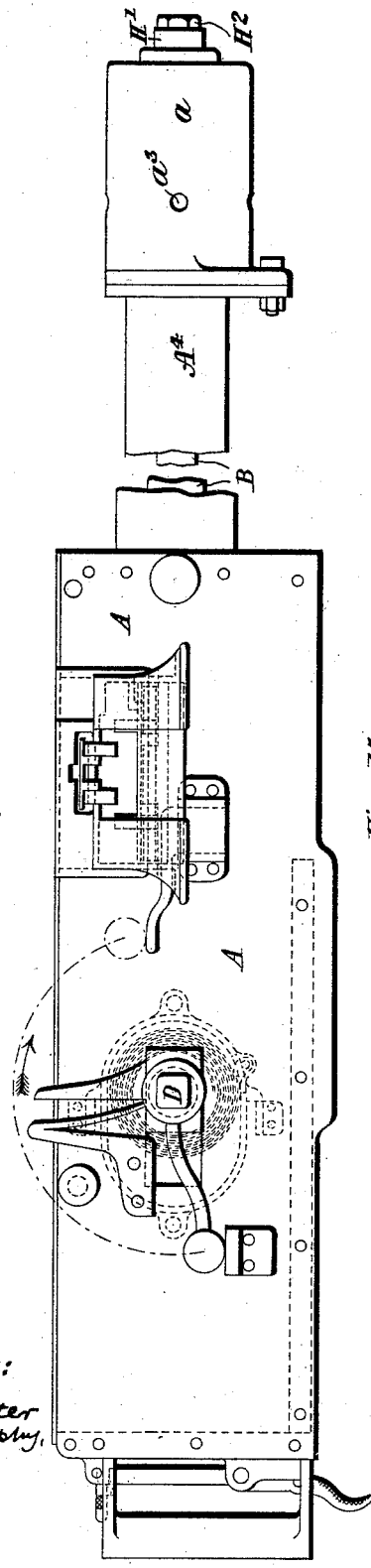
Figure 15:
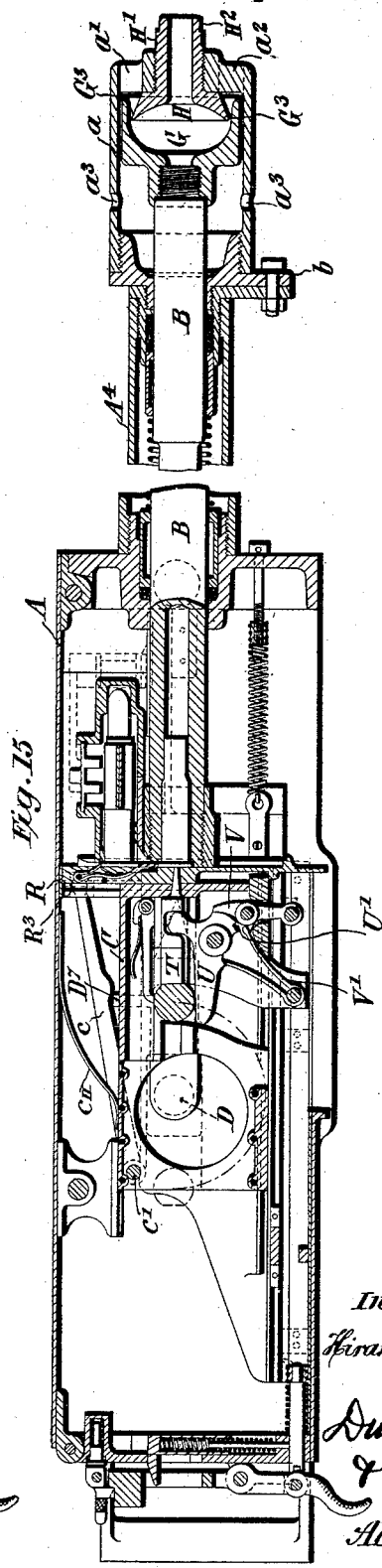

Figure 1 is a side elevation; Fig. 2, a vertical longitudinal central section; and Fig. 3 a plan, partly in horizontal section, the top or cover being removed, showing one form of my improved automatic gun. Fig. 4 is a vertical longitudinal central section showing another arrangement of my improved muzzle attachment, a portion of the gun-barrel being shown in side elevation. Fig. 5 is a longitudinal central section, and Fig. 6 a front elevation, of a hollow cylinder or casing hereinafter described, illustrating a slight modification in the construction of the said muzzle attachment. Fig. 7 is a section on the line $xx$, Fig. 6. Fig. 8 is a side elevation, partly in vertical section, illustrating my improvements applied to a semi-automatic gun. Fig. 9 is a view in side elevation and on an enlarged scale of a portion of the breech mechanism employed in connection with the gun shown in Figs. 1, 2, and 3. Figs. 10 and 11 are sectional side elevations of a breech mechanism of the said gun, drawn more particularly for the better illustration of the firing mechanism of the same. Fig. 12 is an enlarged side elevation of a modification of the gun of Figs. 1 and 3. Fig. 13 is an enlarged side elevation, partly in vertical section, of the semi-automatic gun shown in Fig. 8, with the parts in a different position. Fig. 14 is a side elevation, and Fig. 15 a vertical longitudinal central section, illustrating one of the applications of my improved muzzle attachment to a gun provided with means whereby the breech mechanism will be operated in the recoil of the gun in a frame or support.

Figure 3:
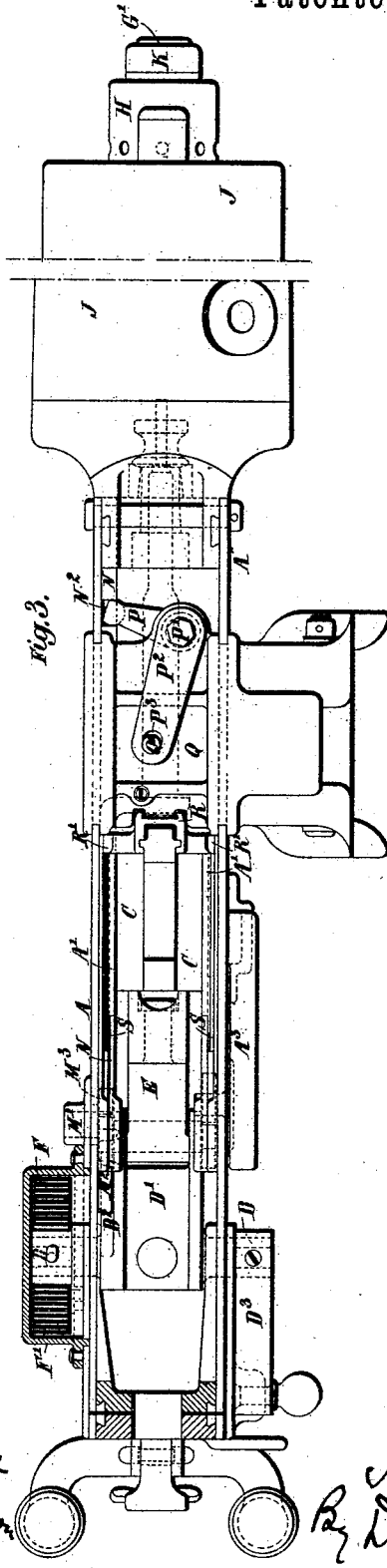

Referring to the particular form of gun shown in Figs. 1, 2, and 3, A is an outer frame or cradle which is to be mounted, by means or trunnions or otherwise, on a suitable carriage or mounting in such a manner that it can be turned about a horizontal pivot or axis to effect the vertical pointing or elevation of the gun. B is the barrel, which is firmly fixed in the said frame in any convenient manner. C is the breech-block, which is fitted to slide between guides $A'$ in the said frame or cradle. D is a crank-shaft supported in suitable bearings in the said frame or cradle, and the crank $D'$ of which is coupled by means of a link E to the breech-block C.

F is a spring inclosed in a suitable casing $F'$ and designed to store up energy when the crank-shaft D is partially rotated in one direction, and by its reaction to subsequently effect the return movement of the said crank-shaft.

G is the movable cup-shaped piece or disk, which is arranged in front of the muzzle of the gun. H is the other cup-shaped piece or disk, which is secured in the forward end of a cooling chamber or casing J, in which the muzzle end of the barrel is free to slide to allow for expansion and contraction of the barrel. The cup-shaped piece or disk H in this form or modification of my invention is formed like a cylinder, and the cup-shaped piece or disk G works like a piston therein. The said cup-shaped piece or piston G is provided with a screw-threaded extension $G'$, whereby it is secured in the forward end of a sliding bar K. The said bar K is fitted to slide in or between guides on the under side of the casing J and is coupled at its rear end to the forward end of a rod L, the rear end of which is coupled to a lever M, pivoted at $M'$ to the outer frame A. This lever M is provided with an arm $M^2$, Figs. 10 and 11, which when said lever is turned about its pivot acts upon a curved surface $D^2$ of the crank $D'$ in such a manner as to partially rotate the said crank in the direction indicated by the arrow in Fig. 2. The surface $D^2$ and the corresponding surface of the arm $M^2$ are so formed and arranged that the point of contact between the same will in this movement of the said crank gradually approach the center of rotation of the crank-shaft, so that an accelerated motion will be imparted to the said crank. The rod L is provided with a collar $L'$, and between this collar and a shoulder $A^2$ on the outer frame A is arranged a spring $L^2$, which surrounds the said rod.

The lever M is provided with a short arm $M^3$, which extends into a slot or notch $N'$ in a bar N, which is fitted in suitable guides in one side of the outer frame A. This bar N has near its forward end another notch $N^2$, into which extends an arm P, fixed upon a vertical shaft $P'$, supported in a suitable bearing in the frame A. The said vertical shaft also has fixed upon it an arm $P^2$, provided with a slot $P^3$. This arm engages with a pin or stud $Q'$ in a sliding piece Q, which is provided with suitable pawls and is adapted to intermittently feed a belt of cartridges through an aperture in the frame A above the rear end of the barrel. This cartridge-feed mechanism, however, may be very much varied and forms no part of my present improvement.

The particular description of feed mechanism above described is that for which I obtained a patent, No. 395,791, on January 9, 1889. The breech mechanism is also constructed substantially as described in the said specification—that is to say, a vertically-movable feed slide or carrier R, Figs. 3 and 9, is provided on the forward end of the breech-block C. This slide or carrier is provided with projections $R'$, which in the to-and-fro movement of the breech-block move around the raised cam-surfaces S on the interior of the frame A. The said slide or carrier is adapted to engage with the flange of a cartridge in the barrel and also with the flange of a cartridge in the feed-belt. The upward movement of the slide R, by which it is caused, after forcing a loaded shell in the barrel and the empty shell into the tube W, is effected by the mechanism shown in Fig. 9.

$E'$ is an arm or projection formed on or firmly secured to the link E.

$E^2$ is a lever pivoted at $E^3$ to the breech-block C. One arm of the lever $E^2$ engages with lugs or projections $R^2$, formed on or firmly secured to the carrier R. The arm or projection E' engages with the other arm R³, so as to raise the said carrier R. A lever E² and arm or projection E' may be provided at both sides of the breech-block.

The firing-pin T is arranged to slide between suitable guides in the breech-block C. The safety-sear T' is pivoted to the breech-block above the said firing-pin and is adapted to engage with a shoulder or projection T² thereon. This sear will be automatically disengaged from the firing-pin by the link or connecting-rod E at the termination of the forward or return movement of the breech-block.

U is the firing-hammer, which is pivoted to the breech-block and one arm of which extends into a notch in the firing-pin, the other arm thereof extending into the path of the link E, so that the cocking of the gun will be effected by the said link during the opening of the breech.

V is a sear pivoted to the breech-block and adapted to engage with a shoulder U' on the firing-hammer U. This sear is acted upon by a spring V', which also acts upon the firing-pin T. The release of this sear from the firing-hammer is effected by means of a trigger-rod V², operated by means of a lever or trigger V³, the operation being substantially as described in the said former specification, No. 395,791.

W is a pipe or passage arranged beneath the barrel for the ejection of the empty cartridge-shells from the gun in such a manner that they will not interfere with the movements of the gunner. The carrier R in its forward movement thrusts the empty cartridge-shell into this tube and is disengaged from the flange of the said cartridge-shell by its subsequent upward movement. A spring-catch W' is provided for preventing backward movement of the cartridge-shells in the said tube.

When the gun is fired, the shot or bullet passes through the passage G² in the piston G. The gases issuing from the muzzle of the gun expand within the chamber formed between the piston G and the cylinder H, from which chamber the gases can escape only through the said passage G² and through an annular space G³ between the piston G and cylinder H. The force or pressure exerted by the gases upon the piston G drive the same forward, together with the rods K and L, thus compressing the spring L² and turning the lever M about its pivot in such a manner as to cause a partial rotation of the crank D' in the direction indicated by the arrow in Fig. 2. In this partial rotation of the crank-shaft the breech-block is drawn back, the carrier R extracts the empty cartridge-shell from the barrel and at the same time draws a fresh cartridge from the feed-belt or magazine, and the gun is cocked by the link E acting upon the long arm of the hammer U. The spring F is, moreover, wound or coiled up, and by its reaction effects the return movement of the crank-shaft, thus inserting the fresh cartridge in the barrel, closing the breech, and preparing the arm for the next discharge, and, if desired, also automatically effecting the firing of the gun. The lever M being unconnected with the crank D', this lever and the rods L K and piston G will be moved back to their original position by the spring L² previous to the return of the crank. The feeding of another cartridge in the feed-belt or magazine into the required position above the barrel is thus insured before the breech-block is moved forward and the carrier R moved upward to engage with the said cartridge.

To provide for readily disconnecting and removing the rod K from the rod L without the necessity for displacing the said rod L, I couple these rods together in the following manner—that is to say, I provide a nut K', which fits into a hole in the rear end of the rod K and is screwed upon the forward end of the rod L. This nut is held in the said rod K by one or more pins K², fixed in the said rod K and passing through an annular groove or recess K³ in the said nut, so that the said nut is retained in the rod K, but can be turned freely therein to screw it upon or unscrew it from the rod L. I provide the forward end of the said rod with a spring-catch L³, adapted to engage with a shoulder or projection on the said nut to prevent accidental disconnection of the rods K L. I sometimes make the piston G adjustable relatively to the cylinder H, or vice versa, so that I am enabled to vary the area of the annular space between these parts, and thus regulate the action of the gases upon the said piston.

By the above-described arrangement of the piston G and cylinder H, I provide for very efficiently utilizing the force or pressure of the gases issuing from the muzzle of the gun for automatically performing the operations of extracting the empty cartridge-shell and preparing the arm for the next discharge, and also, if desired, for automatically firing the gun.

The invention as thus described may be modified in various particulars. For instance, I sometimes connect the piston G by means of suitable rods or links with an arm or lever M, Fig. 12, fixed upon a shaft or pivot-pin supported in a bearing in the gun-frame. This shaft or pivot-pin M' has fixed upon it a toothed segment M⁴, which is geared with a pinion D⁸, fitted upon the said crank-shaft and connected therewith by a ratchet-wheel D⁴ and pawl D⁵ or other convenient means, whereby the said pinion when turned in one direction will move the crank-shaft in the same direction, but when turned in the reverse direction will move freely upon or independently of the said shaft. The said toothed segment is in some cases provided with an arm $M^3$, which is arranged to operate a slide N or other suitable device for feeding or supplying the cartridges to the gun.

In Figs. 4, 14, and 16 is illustrated the application of my improved muzzle attachment to an automatic or semi-automatic gun provided with means whereby the breech mechanism will be operated in the recoil of the said gun in a frame, cradle, or other support. In this modification of my invention the movable cup-shaped piece or piston G is firmly secured to the muzzle B of the gun, while the cup-shaped piece or disk H is firmly secured in the forward end of a hollow cylinder or casing $a$, firmly attached to a flanged piece $b$, which is secured to the frame or cradle A or to a casing $A^4$, secured to the latter and intended to contain water or other liquid and to form a cooling-chamber round the barrel B, in which the latter is free to slide to and fro. The cup-shaped piece or disk H is stationary and serves as a deflector for the gases issuing from the muzzle. The cup-shaped piece G is movable relatively to H and is formed like a cylinder, which when at the forward end of its stroke or movement works upon the disk H and forms therewith a chamber in which the gases issuing from the muzzle will expand. An annular space $G^3$ is left between the said cup-shaped pieces or disks for escape of the gases from the said chamber.

The carrier R is fitted to slide up and down upon the forward end of the breech-block C, the latter having ribs or projections fitting into grooves in the said carrier. A lever $c$ is provided at each side of the breech-block C. One end of each of the said levers $c$ is pivoted at $c'$ to the said breech-block, and the other or forward end of the said lever enters a slot $R^4$, formed in the said carrier R, or in lugs or projections thereon. A stud or projection $D^7$ is fixed or formed on each web of the crank-shaft D, which studs or projections are designed to act upon the levers $c$ to effect the upward movement of the carrier R.

$c''$ is a spring attached to the cover or top of the frame A, which effects the downward movement of the carrier R. When a cartridge is exploded in the barrel B, the inner frame or breech-block C and the parts carried thereby recoil in the outer frame A and act upon the crank-shaft D, the said recoil movement of the gun B being increased or assisted by the action of the gases in the above-described muzzle attachment.

The forward end of the cylinder or casing $a$ has apertures $a'$ formed therein around the extension $H'$ of the disk or deflector H, the parts or bridges $a^2$ between these apertures being preferably V-shaped or of triangular form in transverse section, as shown in Fig. 7, with the apex at the rear, so that they will offer but little resistance to the escape of the gases from the said cylinder or casing. In some instances I provide the said casing $a$ with apertures $a^3$ in its periphery for the escape of the gases. These apertures may, if desired, be elongated, so that the gases will escape more and more freely as the cup-shaped piece G moves backward. The said apertures may, moreover, be either parallel or taper from end to end or of other suitable shape.

I find it advantageous to make the disk or deflector H adjustable longitudinally relatively to the cup-shaped piece G, so that the action of the gases upon the latter may be varied by increasing or diminishing the area of the annular passage $G^3$. For this purpose I sometimes make said disk or deflector H with a screw-threaded tubular extension $H'$ and screw the same into the forward end of the cylinder or casing $a$, and I make the said extension $H'$ with a hexagonal or other suitably-shaped part $H^3$, whereby a key or spanner may be applied thereto for the purpose of adjusting the said disk or deflector; or instead of making the disk or deflector adjustable I can, if desired, make the cup-shaped piece G adjustable on the barrel B for the purpose above specified.

In Figs. 8 and 13 I have shown my improvement applied to a semi-automatic gun—that is to say, a gun in which the operations of opening the breech and extracting the empty cartridge-shell are automatically performed and the breech is then kept open until a fresh cartridge is inserted by hand or otherwise, whereby the breech-block is released, thus permitting the automatic closing of the breech. In the gun shown in said figures the movable cup-shaped piece or piston G is connected, by means of the rods K L and a link or connecting-rod Y, with an arm or lever $D^2$, fixed upon the crank-shaft D. The pin of the crank $D'$ works in a groove or slot $C'$ in the breech-block C, which by the partial rotation of the said crank alternately in either direction can be moved transversely to the axis of the barrel to open and close the breech. The pivoted extractor Z is provided with an arm $Z'$, which extends into the path of the breech-block, so that in the downward movement of the latter the said extractor will be turned about its pivot, and thus caused to eject the empty cartridge-shell from the gun. The extractor Z is, moreover, provided with a stud or projection $Z^2$, adapted to engage with a notch $C^2$ in the top of the breech-block when the breech is open, and thus hold down the said block until a fresh cartridge is inserted in the barrel. It is evident that when the gun is fired the force or pressure of the gases expelled from the muzzle will, through the medium of the piston G, rods K L, connecting-rod Y, and crank-shaft D, effect the opening of the breech and the extraction of the empty cartridge-shell.

By my present improvements I provide for the efficient use of an automatic or semi-automatic gun either with ball-cartridges or with blank cartridges, the force derived from the gases which issue from the muzzle of the gun being sufficient to operate the breech mechanism either with or without the force derived from the recoil when a ball-cartridge is employed in a gun.

What I claim is—

1. The combination, with a gun-barrel, of a chamber at or around the muzzle and composed of parts movable with respect to one another, whereby the chamber will be elongated by the expansion therein of gases issuing from the muzzle, breech mechanism for the operation of the gun, and intermediate connections between a movable part of the expansion-chamber and the said breech mechanism, whereby the latter is automatically operated or set in operation by the discharge of the gun, as set forth.

2. The combination, with a gun-barrel, of breech mechanism for operating the gun, two cup-shaped pieces or disks placed one in front of the other and forming at or around the muzzle end of the barrel a chamber in which the gases issuing from the muzzle will expand and one of which is movable longitudinally relatively to the other, and intermediate connections between the said movable piece and the breech mechanism, as herein set forth.

3. The combination, with a gun-barrel, a breech-block movable relatively thereto, and loading, firing, and extracting mechanism connected with the said breech-block, of a muzzle attachment comprising flanged or cup-shaped pieces or disks, one of which is movable longitudinally relatively to the other and is located in front of the other, thus forming a chamber in which the gases issuing from the muzzle of the gun will expand, and intermediate connections between the breech-block and the movable cup-shaped piece or disk, whereby a movement of the latter operates the said mechanism, as set forth.

4. The combination, with a gun, of a muzzle attachment comprising two cup-shaped pieces or disks G H, arranged one within and in front of the other and forming a chamber in front of the muzzle in which the gases issuing from the muzzle will expand, one of the said cup-shaped pieces or disks being fixed or stationary and the other movable and connected with the breech mechanism of the gun, for the purpose above specified.

5. The combination, with a gun-barrel and breech mechanism therefor, of a muzzle attachment comprising a stationary cup-shaped piece or disk, and a movable cup-shaped piece or disk arranged one in front of the other and forming a chamber in front of the muzzle in which the gases issuing from the muzzle will expand, one of the said cup-shaped pieces or disks being adjustable relatively to the other, and intermediate connections between the breech mechanism and the movable cup-shaped piece or disk, whereby a movement of the latter operates the said mechanism, for the purposes above specified.

6. In a gun operated by force derived from the explosion in the barrel, the combination, with the barrel and breech mechanism therefor, of two flanged or cup-shaped pieces arranged one within the other, one connected with the breech mechanism, the other fixed to the muzzle of the gun, and both forming a chamber into which the gases from the gun after a discharge will enter and expand, as set forth.

7. The combination, with a flanged or cup-shaped piece or disk attached to a gun and arranged to be operated by the gases issuing from the muzzle thereof, of a lever connected with the said cup-shaped piece or disk and arranged to act upon a crank for operating the breech mechanism, and feed mechanism also operated by the said lever, whereby the said mechanism will be moved forward after the backward movement, but before the forward or return movement of the breech-block, substantially as and for the purposes set forth.

8. The combination, with the gun having the crank-shaft connected with the breech-block, of the stationary cup-shaped piece or cylinder surrounding the muzzle of the gun, the movable cup-shaped piece or piston working in the said cylinder, the bent lever pivoted to the gun-frame and adapted to act upon the said crank-shaft, the rods connecting the said movable piece or piston with the said lever, and a spring for storing energy during the forward movement of the said rods and piston and for effecting the backward or return movement thereof, substantially as and for the purposes set forth.

9. The combination, with the breech mechanism of a gun and a crank-shaft for operating the said mechanism, of a lever for actuating the said crank-shaft, and a muzzle attachment comprising a stationary piece secured to the gun or its frame, and a movable piece connected with the said lever and adapted to be moved by the gases issuing from the muzzle, the adjacent surfaces of the said lever and crank-shaft being convex, so that in the partial rotation of the said crank-shaft by the lever their point of contact will approach the center of rotation of the said shaft, for the purposes above specified.

10. In a machine-gun, the combination, with the barrel, a cradle or frame therefor, and a movable cup-shaped piece or piston arranged in front of the muzzle, of a bent lever pivoted to the frame and connected to the cup-shaped piston, the cartridge-feed mechanism, a connecting-rod between the same and the bent lever, and an arm $M^3$ on the latter engaging with the said rod, as set forth.

11. The combination, with the barrel, a cradle or frame therefor, the muzzle attachment provided with a movable cup-shaped piston in front of the muzzle, and a bent lever for operating the breech mechanism and pivoted to the frame, of the rods K L, connecting the cup-shaped piston with the bent lever, and the nut K', screwed upon one end of the rod L and held in the rod K while capable of rotation therein, as set forth.

12. The combination, with the breech mechanism comprising the crank-shaft coupled to the breech-block, of a lever pivoted to the gun-frame and adapted to partially rotate the said crank-shaft in one direction, a muzzle attachment comprising a movable flanged or cup-shaped piece or disk connected with the said lever and actuated by the gases expelled from the muzzle, and springs or their equivalents for effecting the return movement of the said lever and crank-shaft, respectively, for the purposes above specified.

In testimony whereof I have hereunto signed my name in the presence of two subscribing witnesses.

HIRAM STEVENS MAXIM.

Witnesses:
  DAVID YOUNG,
  A. E. NIXON.